United States Patent
Jensen et al.

(10) Patent No.: US 12,535,154 B2
(45) Date of Patent: Jan. 27, 2026

(54) TUBING CLIP

(71) Applicant: Cooper-Standard Automotive Inc., Northville, MI (US)

(72) Inventors: Jacob C. Jensen, Farmington Hills, MI (US); Brian J. Cardwell, Ypsilanti, MI (US); Stephen S. Frederiksen, Clarkston, MI (US); Gerardo Flores Gutierrez, Coahuila (MX)

(73) Assignee: Cooper-Standard Automotive Inc., Northville, MI (US)

( * ) Notice: Subject to any disclaimer, the term of this patent is extended or adjusted under 35 U.S.C. 154(b) by 0 days.

(21) Appl. No.: 18/499,192

(22) Filed: Oct. 31, 2023

(65) Prior Publication Data

US 2025/0137558 A1     May 1, 2025

(51) Int. Cl.
  *F16L 3/22*     (2006.01)
  *B60R 16/08*    (2006.01)
  *B64D 37/00*    (2006.01)
  *F16L 3/237*    (2006.01)

(52) U.S. Cl.
  CPC .............. *F16L 3/222* (2013.01); *B60R 16/08* (2013.01); *B64D 37/005* (2013.01); *F16L 3/237* (2013.01)

(58) Field of Classification Search
  CPC .......... F16L 3/222; F16L 3/237; B60R 16/08; B64D 37/005
  USPC ....................................................... 248/68.1
  See application file for complete search history.

(56) References Cited

U.S. PATENT DOCUMENTS

| | | | | |
|---|---|---|---|---|
| 3,913,187 A | * | 10/1975 | Okuda | F16L 3/1075 24/484 |
| 5,653,411 A | * | 8/1997 | Picco | F16L 3/2235 24/339 |
| 6,089,513 A | * | 7/2000 | Cau | F16L 3/223 248/68.1 |
| 7,241,071 B2 | * | 7/2007 | Carraher | E04C 5/163 52/719 |
| 7,556,225 B2 | | 7/2009 | Riedy et al. | |
| 7,658,350 B2 | | 2/2010 | Bauer | |
| 8,708,289 B2 | * | 4/2014 | Allenbach | F16L 3/2235 248/68.1 |
| 8,910,912 B2 | | 12/2014 | Child et al. | |
| 9,416,896 B1 | | 8/2016 | Kato et al. | |
| 9,453,593 B2 | | 9/2016 | Pearson et al. | |
| 9,541,223 B2 | | 1/2017 | Meyers et al. | |
| 10,557,569 B2 | | 2/2020 | Meyers et al. | |
| 10,655,374 B2 | * | 5/2020 | Fukumoto | F16L 3/237 |
| 2023/0213119 A1 | * | 7/2023 | Maury | F16L 3/221 24/459 |

FOREIGN PATENT DOCUMENTS

| | | |
|---|---|---|
| CN | 1328533 U | 12/2001 |
| CN | 205978826 U | 2/2017 |

(Continued)

*Primary Examiner* — Anita M King
(74) *Attorney, Agent, or Firm* — Paschall & Associates, LLC; James C. Paschall; Joseph A. Fuchs (57) ABSTRACT

Disclosed herein is a component for a tubing clip having a body having a first end and a second end, a first tube channel, and a first arcuate arm and a second arcuate arm spaced along the body. The first arcuate arm defines the first tube channel and has a first connecting structure and the second arcuate arm has a second connecting structure for adjustably connecting to a second component.

20 Claims, 12 Drawing Sheets

(56) References Cited

FOREIGN PATENT DOCUMENTS

| | | |
|---|---|---|
| CN | 206001120 U | 3/2017 |
| CN | 206054929 | 3/2017 |
| CN | 207161879 U | 3/2018 |
| CN | 208816875 U | 5/2019 |
| CN | 210218927 U | 3/2020 |
| CN | 210510547 | 5/2020 |
| CN | 210600441 U | 5/2020 |
| CN | 213929734 U | 8/2021 |
| CN | 214500256 U | 10/2021 |
| CN | 215119048 U | 12/2021 |
| CN | 216555710 U | 5/2022 |
| CN | 217056804 U | 7/2022 |
| CN | 115585311 U | 1/2023 |
| DE | 602004002123 T3 | 11/2015 |
| EP | 1529997 B1 | 12/2012 |
| JP | 2009191879 A | 8/2009 |
| JP | 2019152263 A | 9/2019 |
| JP | 6666660 B2 | 3/2020 |

\* cited by examiner

TUBING CLIP

FIELD

The present disclosure relates generally to clips adapted to support tubes such as lines carrying fluids. More particularly, molded plastic clips for use in construction, excavation, and transportation vehicles including automobiles, trucks, aircraft, bulldozers, cranes, and the like to support fluid lines for cooling, braking, transmission, fuel systems, and the like.

BACKGROUND

Flexible tubing is commonly used in vehicles such as automobiles, trucks, construction and excavation machines, and others to convey fluids needed to operate, for example, an engine, a battery, and power equipment associated with the vehicle. Such tubing is typically routed along a desired path between components using metal holding components. Metal holding components may be relatively expensive to produce and have relatively high weight. Accordingly, an improved holding assembly which is easier to use and reduces weight while providing a secure support structure would be desirable.

SUMMARY

Disclosed herein is a component for a tubing clip having a body having a first end and a second end, a first tube channel, and a first arcuate arm and a second arcuate arm spaced along the body. The first arcuate arm defines the first tube channel and has a first connecting structure and the second arcuate arm has a second connecting structure for adjustably connecting to a second component.

Also disclosed herein is a tubing clip having a body with a first tube channel, a first component, and a second component. The first component has a first arcuate arm supporting a first connecting structure and a second arcuate arm supporting a second connecting structure. The second component has a third arcuate arm supporting a third connecting structure and a fourth arcuate arm supporting a fourth connecting structure. The first connecting structure adjustably engages the third connecting structure and the second connecting structure adjustably engages the fourth connecting structure, and the first component may be moved with respect to the second component to change a diameter of the first tube channel.

Also disclosed herein is a tubing clip having a body with a first tube channel, a first set of deflectable fingers in the first tube channel, a first component, and a second component. The first component has a first arcuate arm supporting a first connecting structure and a second arcuate arm supporting a second connecting structure. The second component has a third arcuate arm supporting a third connecting structure and a fourth arcuate arm supporting a fourth connecting structure. The first connecting structure adjustably engages the third connecting structure and the second connecting structure adjustably engages the fourth connecting structure. The first component may be moved with respect to the second component to change a diameter of each of the first tube channel.

Other features and advantages of the invention will be apparent from the following specification taken in conjunction with the following Figures.

BRIEF DESCRIPTION OF THE DRAWINGS

To understand the present invention, it will now be described by way of example, with reference to the accompanying drawings in which.

DETAILED DESCRIPTION

While this disclosure is susceptible of embodiments in many different forms, there is shown in the drawings and will herein be described in detail preferred embodiments of the invention with the understanding that the present disclosure is to be considered as an exemplification of the principles of the disclosure and is not intended to limit the broad aspect of the disclosure to the embodiments illustrated.

Figure 1:
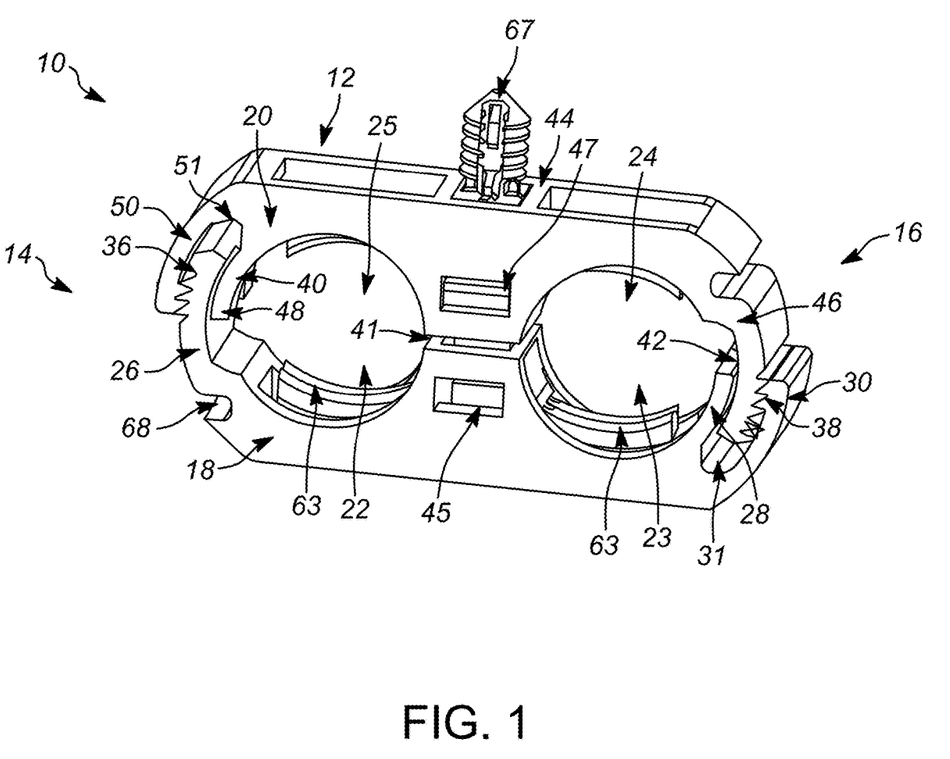
FIG. 1 is a perspective view of an embodiment of a tubing clip.
Figure 2:
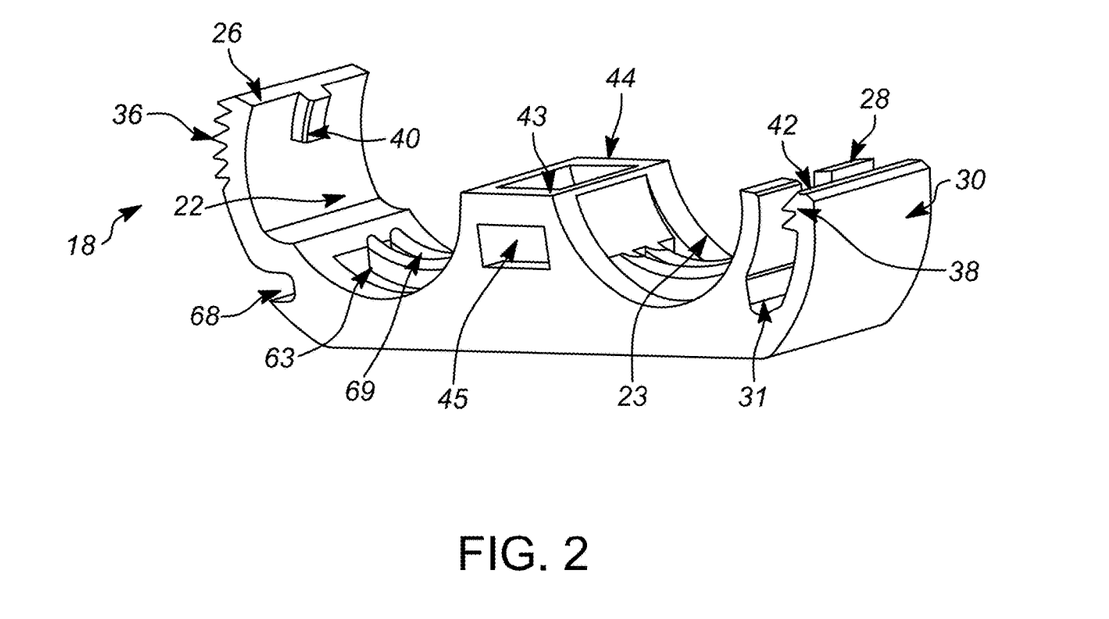
FIG. 2 is a perspective view of a component used to build the tubing clip of FIG. 1.
Figure 3:
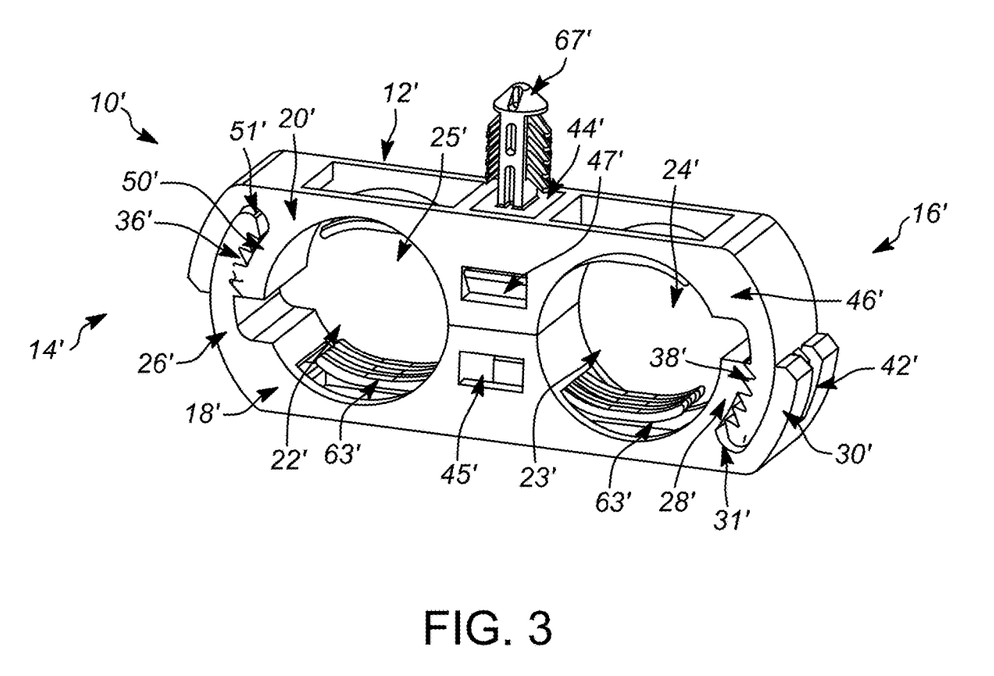
FIG. 3 is a perspective view of another embodiment of a tubing clip.

FIGS. 1-4 show two alternative embodiments of a tubing clip 10 and 10'. The tubing clip 10 of FIG. 1 is formed by joining two identical components 18 shown in FIG. 2. Likewise, the tubing clip 10' of FIG. 3 is formed by joining two identical components 18' shown in FIG. 4.

FIGS. 1-2 show a first embodiment of a tubing clip 10 having a body 12 with a first end 14 and a second end 16, a first component 18 and a second component 20, and a first tube channel 22 having a first diameter and a second tube channel 23 having a second diameter. While two tube channels are shown, it is contemplated that a tubing clip 10 could have from 1 to 10 tube channels, more preferably from 1 to 8, more preferably from 2 to 6, and most preferably from 2 to 4.

The first component 18 has a first arcuate arm 26 at the first end 14, a second arcuate arm 28, and a third arcuate arm 30 at the second end 16. A first cavity 31 is positioned between the second arcuate arm 28 and the third arcuate arm 30 and is dimensioned to receive a portion of a fourth arcuate arm 46. The first arcuate arm 26 defines a portion of the first tube channel 22, and the second arcuate arm 28 defines a portion of the second tube channel 23.

The second component 20 has the fourth arcuate arm 46, a fifth arcuate arm 48, and a sixth arcuate arm 50. A second cavity 51 is positioned between the fifth arcuate arm 48 and the sixth arcuate arm 50 and is dimensioned to receive a portion of the first arcuate arm 26.

FIG. 2 shows the first arcuate arm 26 having a first surface with a first set of teeth 36 and an opposed second surface with a protuberance 40. The second arcuate arm 28 has a slot 42 and the third arcuate arm 30 has a second set of teeth 38. The first set of teeth 36 is dimensioned to engage the second set of teeth 38 on a second component in a ratcheting engagement. The ratcheting engagement allows for adjustment of a distance 41 (FIG. 1) between the first component 18 and the second component 20 through a range of distances. The range of distances is from about 0 mm to about 10 mm, more preferably from about 0 mm to about 7 mm, and most preferably from about 0 mm to about 5 mm.

The ratcheting engagement also allows for the adjustment of the first diameter and the second diameter through a range of diameters to accommodate tubings of varying outer diameters. The first set of teeth 36 has five teeth and the second set of teeth 38 has two teeth. The number of teeth can vary from 1 tooth to 10 teeth, more preferably from 2 teeth to 8 teeth, even more preferably from 2 teeth to 6 teeth. The first set of teeth 36 can have the same number of teeth as the second set of teeth 38 or a different number. Preferably, the first set of teeth 36 will have a greater number of teeth than the second set of teeth 38. Additionally, the first diameter can be the same or different from the second diameter. The first diameter and the second diameter can be from about 10 mm to about 30 mm, more preferably from about 12 mm to about 25 mm, and most preferably from about 18 mm to about 25 mm.

The teeth of the first set and the second set start from a top of its corresponding arcuate arm and terminate at an intermediate portion thereof. Alternatively, the position of the teeth can be adjusted downward such that the first tooth is located at an intermediate portion of the arm and the last tooth can be positioned proximate a bottom of the corresponding arcuate arm.

The protuberance 40 is positioned at the top of the first arcuate arm 26 and is centrally disposed between opposed lateral edges. The protuberance 40 is generally rectangular and is dimensioned to fit into the slot 42, which is generally V-shaped, to prevent relative lateral movement of the first component 18 and the second component 20.

A mounting aperture 44 is positioned between the first arcuate arm 26 and the second arcuate arm 28. The mounting aperture 44 is dimensioned to receive mechanisms for connecting the first component 18 or the second component 20 or the clip 10 to other components or clips 10. Suitable attaching mechanisms include a fir tree connector 67 (FIG. 1), an attachment arm 70 (FIG. 8), a bolt 78 (FIG. 9), or other suitable fastener well known to those of ordinary skill in the art. The mounting aperture 44 has a vertical shaft 43 and a horizontal slot 45 and can be said to be generally L-shaped. The horizontal slot 45 is dimensioned to receive a tab or flange 47 extending from the attaching mechanism. Preferably, the tab or flange 47 is flexible and has a surface for engaging a surface of the slot 45 so that it can automatically lock into place into the aperture 44 and can be removed from the aperture by bending the tab or flange 47 out of engagement with the slot.

Figure 10A:
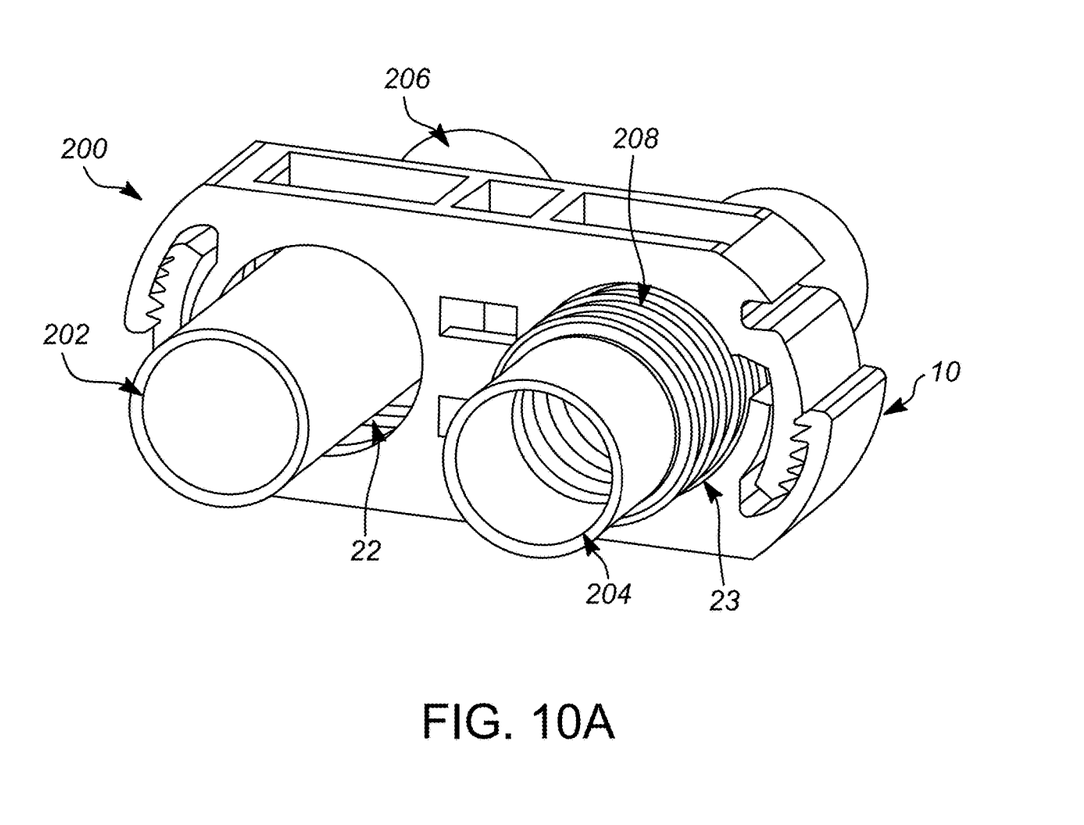
FIG. 10A is a perspective view of a tubing clip and tubing assembly with the tubing clip of FIG. 1.
Figure 10B:
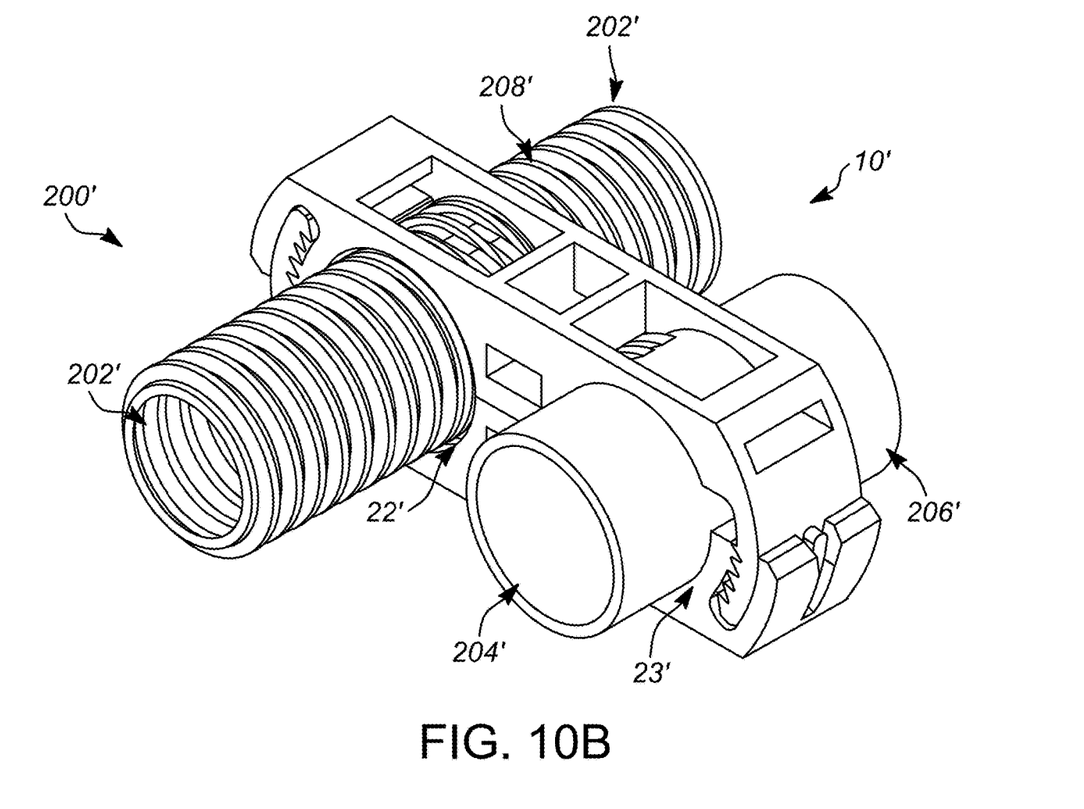
FIG. 10B is a perspective view of a tubing clip and tubing assembly with the tubing clip of FIG. 3.

FIGS. 1, 2, and 5-7 show a tab 64 connected by a hinge 65 to an outer surface of a hemi-cylindrical wall 66 defining the mounting aperture 44 and extends into the first tube channel 22. The tab 64 has an upper surface with longitudinally extending ridges 63. The ridges 63 are dimensioned to engage concentrically disposed ridges found on convoluted tubing 208, 208' as shown in FIGS. 10A and 10B to help prevent the tubing from being pulled in an axial direction from the clip 10. A tab 64 and hinge 65 are also provided with the second tube channel 23. The tab 64 is preferably longitudinally curved to conform to an outer surface of tubing. The tab 64 is mounted by the hinge 65 so that it can move up or down to accommodate tubing of varying diameter.

Figure 8:
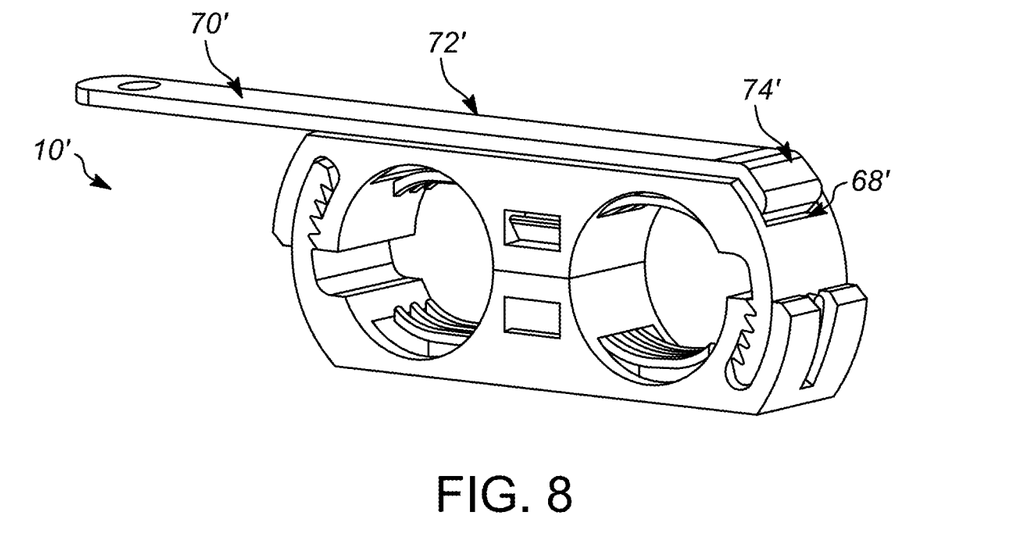
FIG. 8 is a perspective view of the tubing clip of FIG. 3 with an attachment arm.
Figure 9:
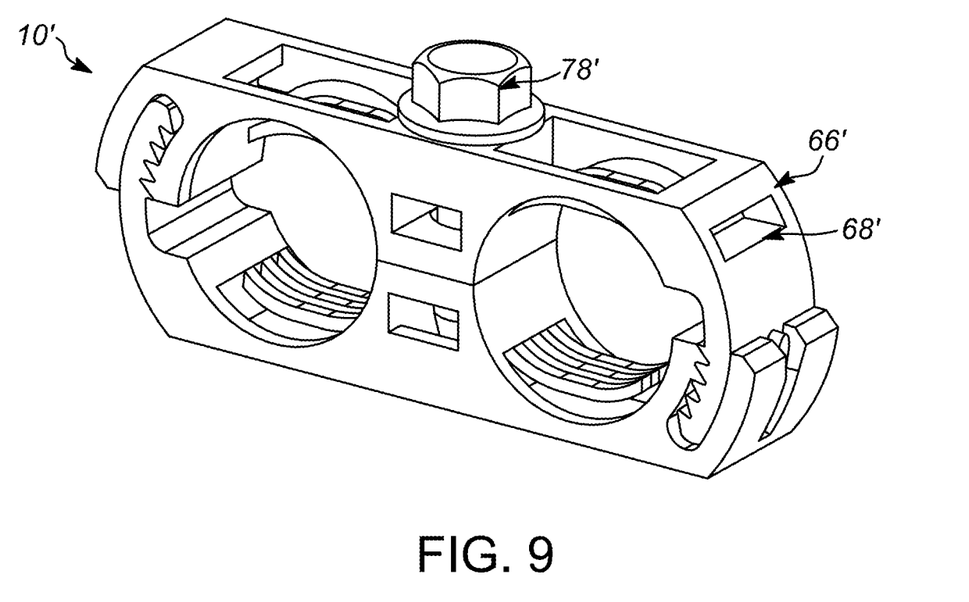
FIG. 9 is a perspective view of the tubing clip of FIG. 3 with a bolt.

FIGS. 1 and 2 show a notch 68 provided on the first end 14 of the first component 18 for receiving an attachment mechanism. The notch 68 can be a slot having a channel through an entire thickness of the first component as shown. The notch 68' can also be a slot bounded at opposed ends by a wall 69 as shown in FIG. 8.

Figure 4:
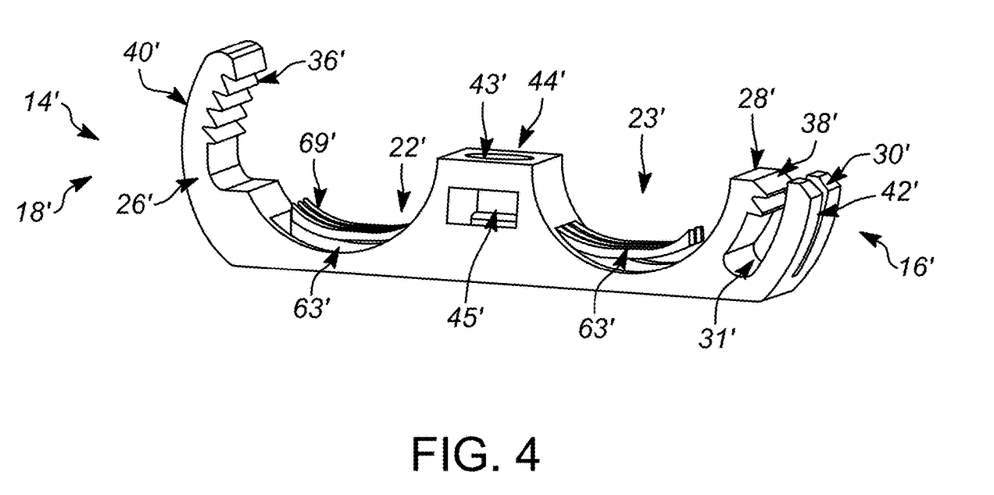
FIG. 4 is a perspective view of a component used to build the tubing clip of FIG. 3.
Figure 5:
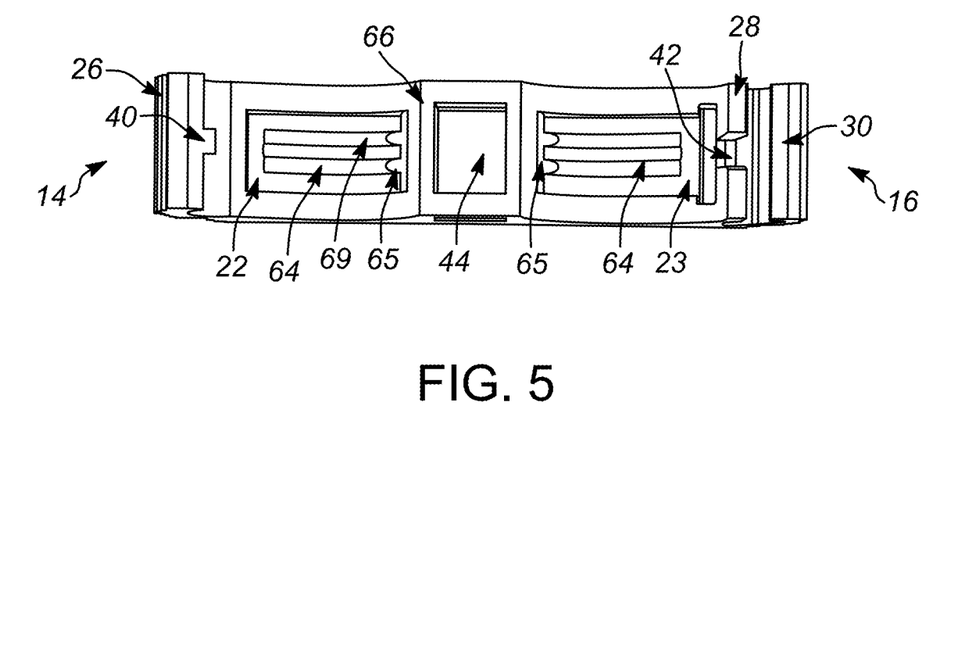
FIG. 5 is a top plan view of the component shown in FIG. 2.
Figure 6:
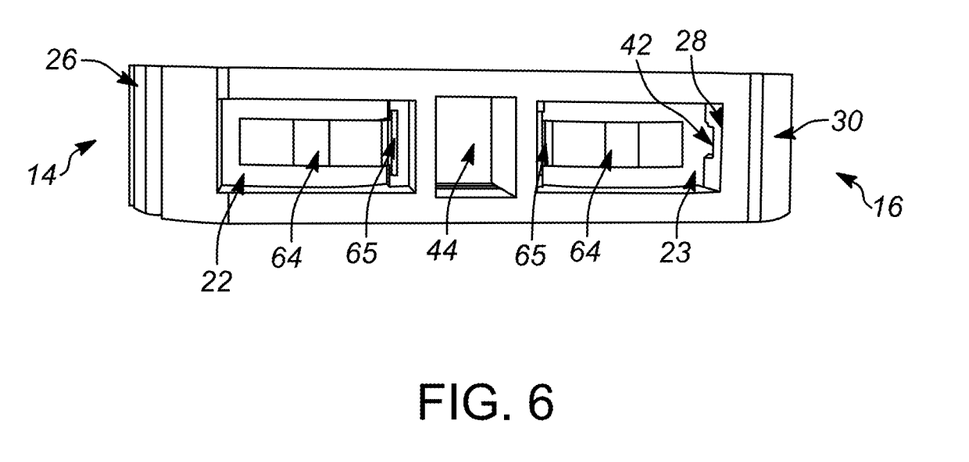
FIG. 6 is a bottom plan view of the component shown in FIG. 2.
Figure 7:
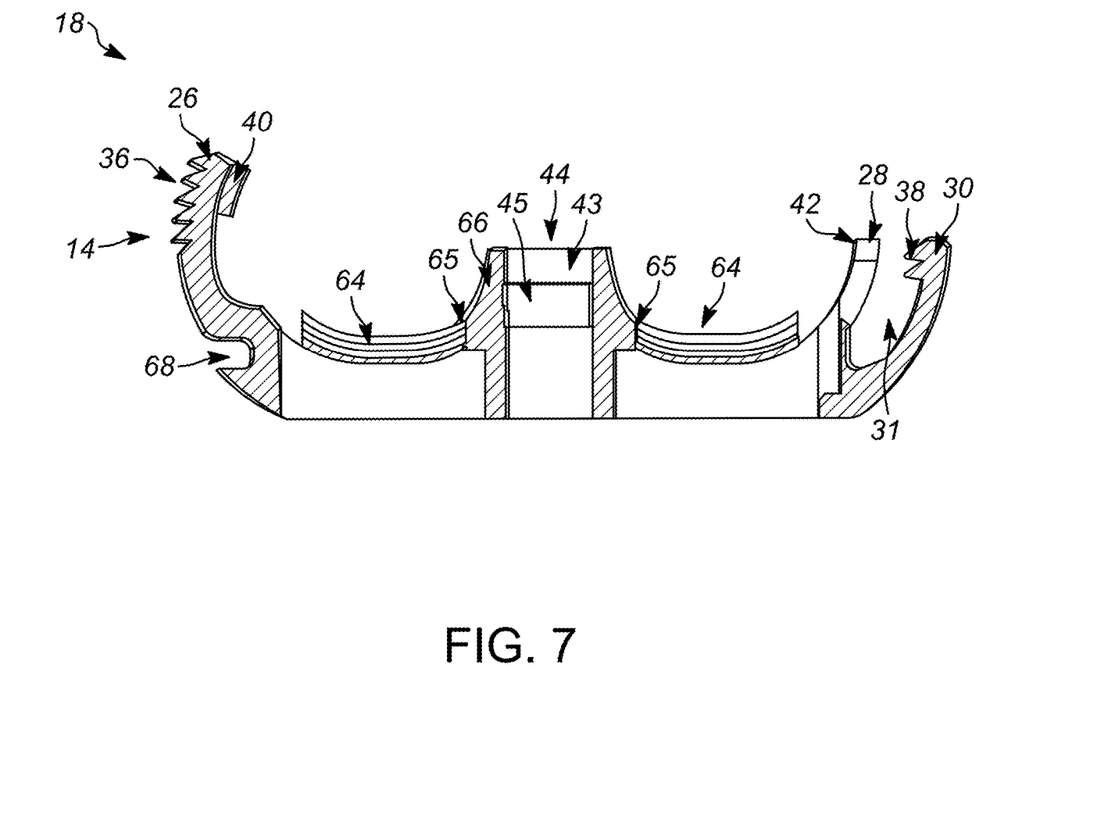
FIG. 7 is a vertical cross-sectional view of the component of FIG. 2.

FIGS. 3 and 4 show another embodiment of a tubing clip 10' and like parts will be referred to with like numbers, except for the addition of a prime (') to the reference number. The tubing clip 10' and the first component 18' differ from those shown in FIGS. 1 and 2 by swapping the placement of the first set of teeth 36' and the protuberance 40' on opposite surfaces of the first arcuate arm 26'. Additionally, the second arcuate arm 28' supports the second set of teeth 38' and the third arcuate arm 30' supports the slot 42' which is the opposite of the embodiment described above.

FIG. 10A shows a tubing clip and tubing assembly 200 having a tubing clip 10 with a first tubing 202 in the first tube channel 22 and a second tubing 204 in the second tube channel 23. The first tubing 202 has a smooth outer surface 206 and the second tubing 204 has a convoluted surface 208. FIG. 10B shows a tubing clip and tubing assembly 200' that is the same as that shown in FIG. 10A but includes the tubing clip 10'. Additionally, the first tubing 202' has a convoluted surface 208' and the second tubing 204' has a smooth surface 206'. Suitable tubing for conveying fluids is typically flexible, made from polymeric materials, and has either a smooth 206, 206' or convoluted surface 208, 208'. The types of tubing can be used in any combination with the tubing clip 10, 10'.

Figure 11A:
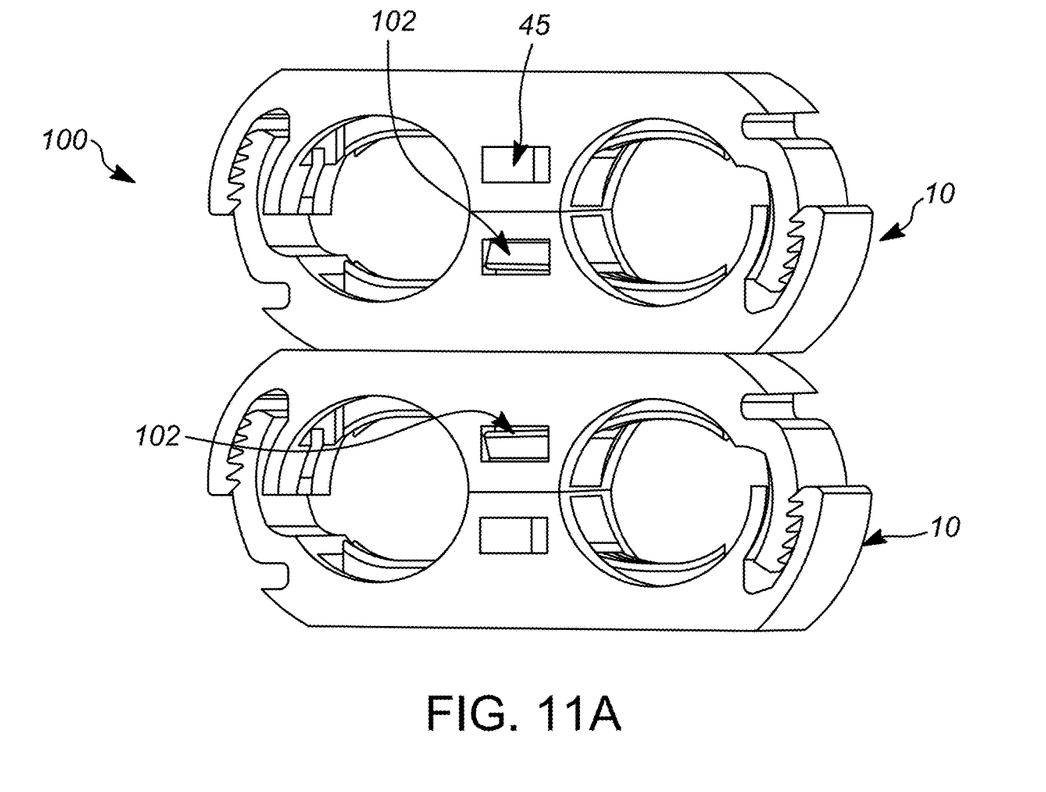
FIG. 11A is a perspective view of a vertical stack of two of the tubing clips of FIG. 1 to form an array.
Figure 11B:
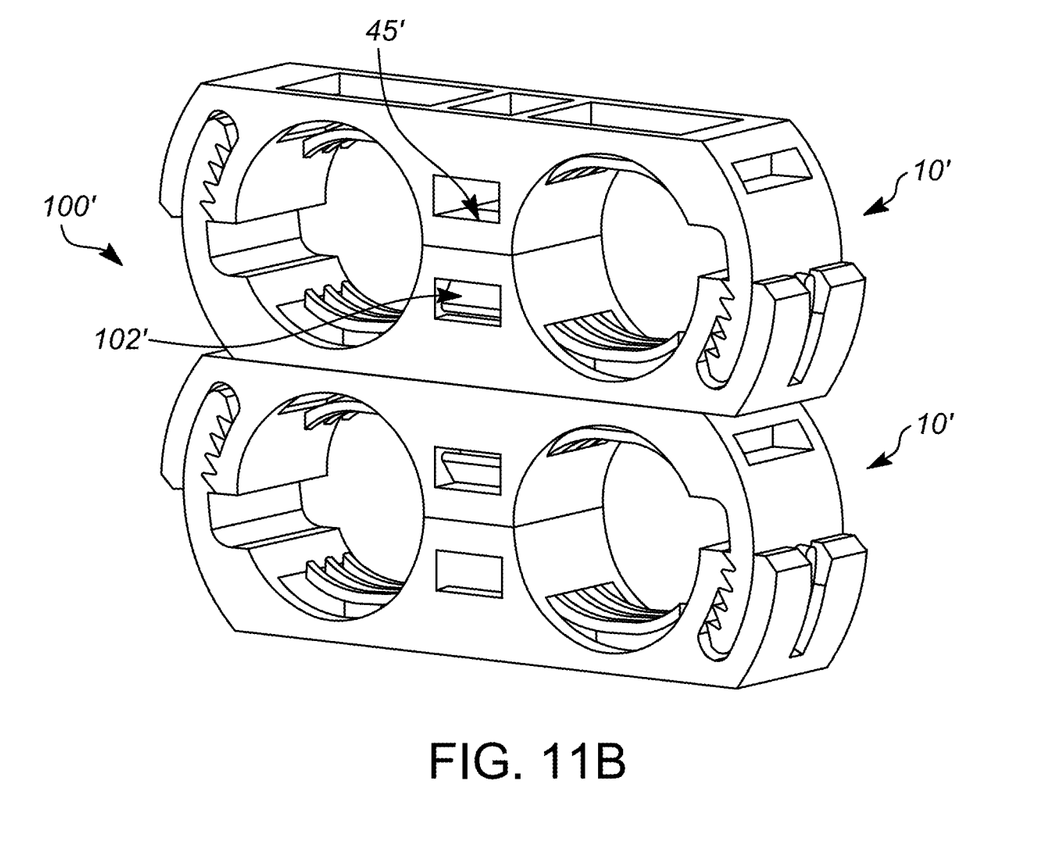
FIG. 11B is a perspective view of a vertical stack of two of the tubing clips of FIG. 3 to form an array.

FIGS. 11A and 11B show an array of tubing clips 100, and 100' respectively formed by connecting two tubing clips 10, 10' with a connector having two deflectable tabs 102, 102' one of each pair of deflectable tabs disposed in the horizontal slot 45, 45'. While a vertical stack of two tubing clips is shown, it is contemplated that any number of tubing clips 100, 100' could be joined together as is practicable for the intended purpose.

Figure 12:
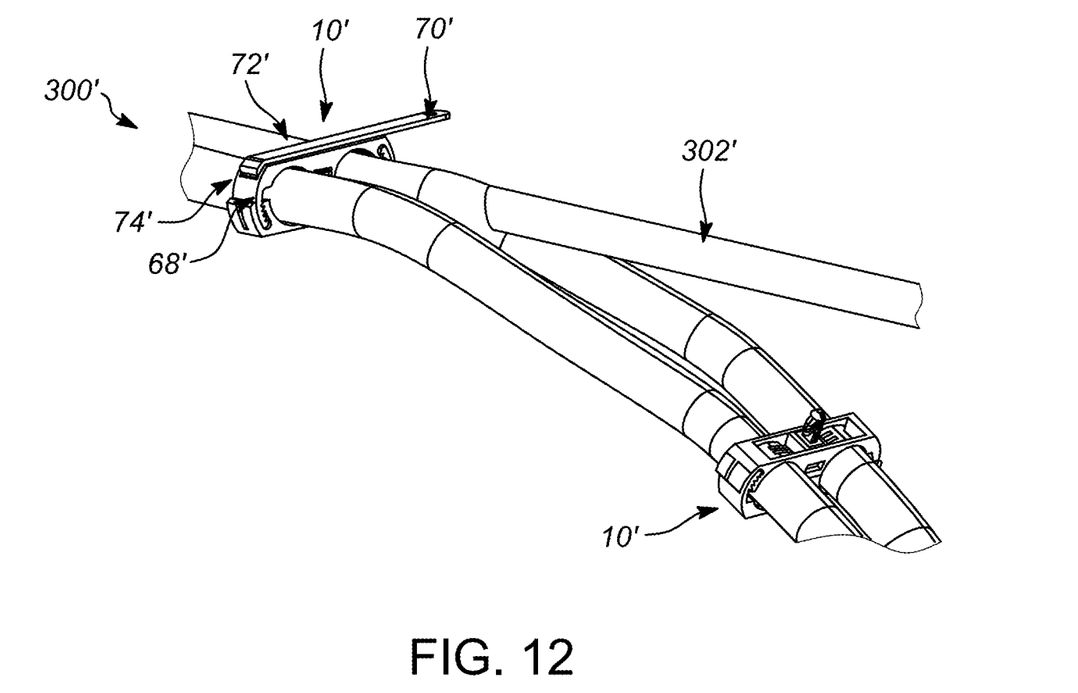
FIG. 12 is a perspective view of a fluid delivery system.

FIG. 12 shows a system for conveying fluids 300' having three tubings 302'. While the second embodiment of the tubing clip 10' is shown, the first embodiment of the tubing clip 10 could be used in this system. Two of the three tubings are positioned in a first tubing clip 10' and on the right side of the clip one of the tubings splits into two tubings. Two of the three tubings 302' are positioned in a second tubing clip 10' downstream of the first clip. The first tubing clip 10' has an attachment arm 70', with a strap 72', and a finger 74' inserted into the notch 68'. The attachment arm 70' can be joined to surfaces using a fasteners such as a threaded fastener, a nail, or other fastener. A suitable adhesive could also be used applied from an external source such as a spray can or can be provided on a surface of the strap 72' and protected by a peel seal material that is stripped away upon use.

To use the tubing clip 10, a length of tubing is placed in one of the tube channels 22, 23 and a second length of tubing is placed in the other of the tube channels of the first component 18. A second component 20 is placed over the tubings with the third tube channel 24 in registration with the second tube channel and the fourth tube channel 25 in registration with the first tube channel 18. The first set of teeth 36 engage the second set of teeth 38 on each of the opposed ends 14, 16 and the second component 20 is pressed towards the first component 18 shortening the distance 41 between the components and clamping the tubing in place. The diameter of the first tube channel 22 can be adjusted independently of the second tube channel 23, within the ranges set forth above. The use of the second embodiment of the tubing clip 10' and the first component 18' is the same as the first embodiment.

Many modifications and variations of the present invention are possible in light of the above teachings. It is, therefore, to be understood within the scope of the appended claims the invention may be protected otherwise than as specifically described.

The invention claimed is:

1. A component for a tubing clip comprising:
a body having a first end and a second end, a first arcuate arm at the first end defines a portion of a first tube channel and has a first connecting structure, a second arcuate arm at an intermediate portion of the body defines a portion of a second tube channel, and a third arcuate arm at the second end separated by a gap from the second arcuate arm for receiving an arcuate arm from another body between the second arcuate arm and the third arcuate arm and in contact therewith, and one of the second arcuate arm or the third arcuate arm has a second connecting structure; and
wherein the first connecting structure and the second connecting structure are configured for adjustably connecting to a second component to adjust a diameter of the first channel and the second channel.

2. The component of claim 1 wherein the first connecting structure is a first set of teeth.

3. The component of claim 2 wherein the second connecting structure is a second set of teeth.

4. The component of claim 1 further comprising a first interlocking feature on one of the second arcuate arm or the third arcuate arm.

5. The component of claim 4 wherein the second arcuate arm has the second connecting structure and the third arcuate arm has the first interlocking feature.

6. The component of claim 5 wherein the first arcuate arm has a second interlocking feature.

7. The component of claim 1 further comprising a vertical shaft between the first tube channel and the second tube channel.

8. The component of claim 7 further comprising a mounting aperture on the vertical shaft.

9. The component of claim 1 further comprising a first set of deflectable fingers in the first tube channel.

10. The component of claim 9 further comprising a second set of deflectable fingers in the second tube channel.

11. The component of claim 8 further comprising a connector in the mounting aperture.

12. A tubing clip comprising:
a first component having a first end and a second end, a first arcuate arm at the first end defines a portion of a first tube channel and has a first connecting structure, a second arcuate arm at an intermediate portion of the first component defines a portion of a second tube channel, and a third arcuate arm at the second end spaced from the second arcuate arm by a first gap, and one of the second arcuate arm or the third arcuate arm has a second connecting structure;
a second component having a third end and a fourth end, a fourth arcuate arm at the third end defines a portion of the second tube channel and has a third connecting structure, a fifth arcuate arm at an intermediate portion of the second component defines a portion of the first tube channel, and a sixth arcuate arm at the second end spaced from the fifth arcuate arm by a second gap, and one of the fifth arcuate arm or the sixth arcuate arm has a fourth connecting structure;
wherein the fourth arcuate arm is positioned in the first gap and in contact with the second arcuate arm and the third arcuate arm and the first arcuate arm is positioned in the second gap and in contact with the fifth arcuate arm and the sixth arcuate arm; and,
wherein the first component can be moved with respect to the second component to change a diameter of the first tube channel and the second tube channel.

13. The tubing clip of claim 12 wherein the first connecting structure is a first set of teeth.

14. The tubing clip of claim 13 wherein the second connecting structure is a second set of teeth.

15. The tubing clip of claim 12 further comprising a vertical shaft between the first tube channel and the second tube channel.

16. The tubing clip of claim 15 further comprising a mounting aperture on the vertical shaft.

17. A tubing clip comprising:
a first component having a first end and a second end, a first arcuate arm at the first end defines a portion of a first tube channel and has a first connecting structure, a second arcuate arm at an intermediate portion of the first component defines a portion of a second tube channel, and a third arcuate arm at the second end spaced from the second arcuate arm by a first gap, and one of the second arcuate arm or the third arcuate arm has a second connecting structure;
a second component having a third end and a fourth end, a fourth arcuate arm at the third end defines a portion of the second tube channel and has a third connecting structure, a fifth arcuate arm at an intermediate portion of the second component defines a portion of the first tube channel, and a sixth arcuate arm at the second end spaced from the fifth arcuate arm by a second gap, and one of the fifth arcuate arm or the sixth arcuate arm has a fourth connecting structure;
wherein the fourth arcuate arm is positioned in the first gap and in contact with the second arcuate arm and the third arcuate arm and the first arcuate arm is positioned in the second gap and in contact with the fifth arcuate arm and the sixth arcuate arm; and,
wherein the first component can be moved with respect to the second component to change a diameter of the first tube channel and the second tube channel; and,
wherein the first tube channel has a first set of deflectable fingers.

18. The tubing clip of claim 17 wherein the first connecting structure is a first set of teeth.

19. The tubing clip of claim 18 wherein the second connecting structure is a second set of teeth.

20. The tubing clip of claim 17 further comprising a second set of deflectable fingers in the second tube channel.

* * * * *